W. S. HARLEY.
FLY WHEEL.
APPLICATION FILED OCT. 15, 1917.
1,264,642.
Patented Apr. 30, 1918.
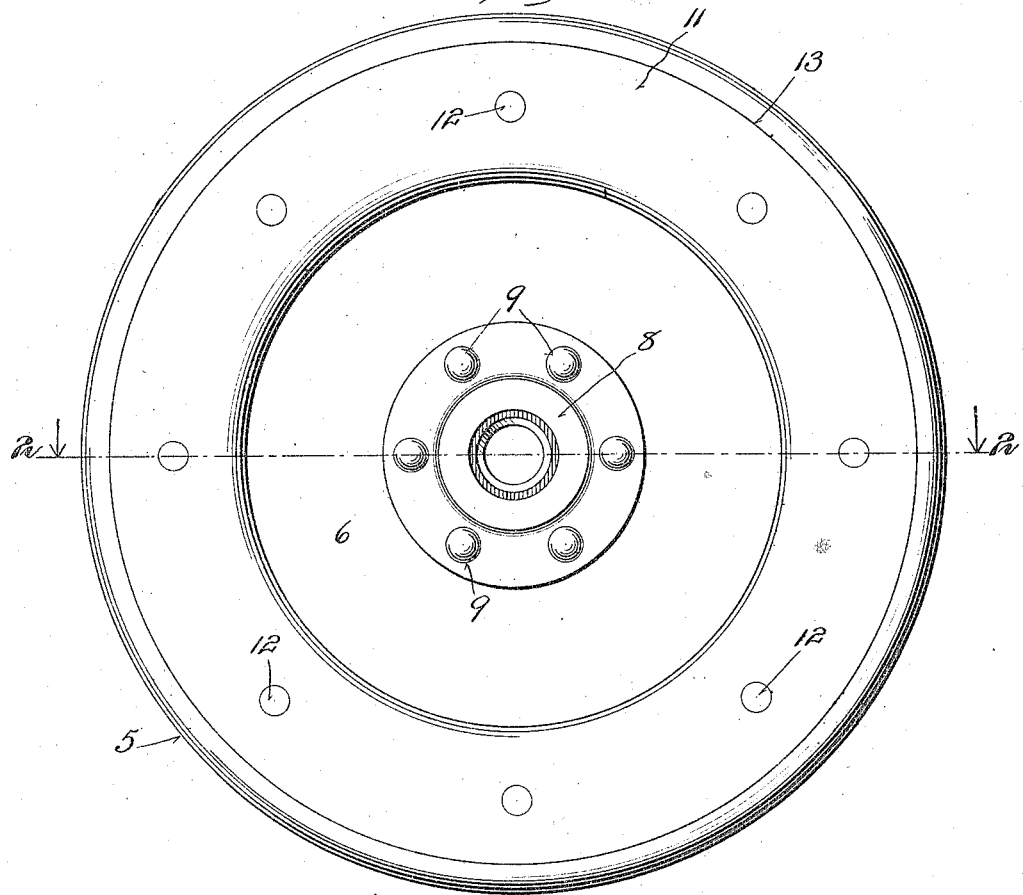
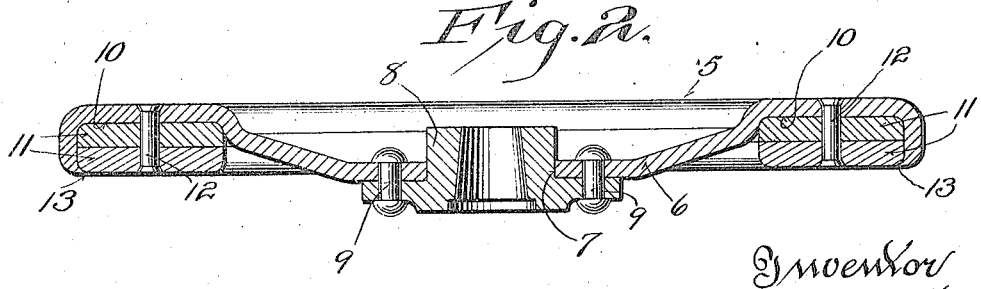

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

FLY-WHEEL.

1,264,642.      Specification of Letters Patent.      Patented Apr. 30, 1918.

Application filed October 15, 1917. Serial No. 196,629.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Fly-Wheels; and I do hereby declare that the following is a full, clear, and exact description thereof.

The present invention relates to certain new and useful improvements in fly wheels and has for its primary object to dispense with the former method of casting fly wheels by constructing the same of several sections stamped from suitable material and securely riveted or otherwise secured together whereby the cost of construction is greatly reduced.

With the above and other objects in view which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawings I have illustrated one complete example of the physical embodiment of my invention constructed according to the best mode I have so far devised for the practical application of the principles thereof, in which:

Figure 1 is a side elevational view of a fly wheel constructed according to and embodying my invention, and Fig. 2 is a transverse sectional view therethrough on the line 2—2 of Fig. 1.

Referring more particularly to the accompanying drawing, 5 designates a main or connecting plate which is bulged outwardly as at 6 and provided with a centrally disposed aperture 7 adapted to receive the collar or shoulder 8 of a flanged hub which is secured in place by means of a series of evenly spaced rivets 9 passing through alined openings in the flange of said hub and the bulged portion of said connecting plate.

The connecting plate 5 has its outer peripheral portion formed with an annular groove 10 for the reception of a pair of annular rim plates 11 which are secured therein by means of rivets or other fastenings 12, the outer edges of the groove and rim plates being correspondingly rounded. The rivets 12 are evenly spaced about the rim plates and connecting plate in order that the fly wheel may have a perfect balance as will be readily understood.

The connecting plate 5 and rim plates 11 are each struck from a single sheet of metal, and the peripheral edge portion of plate 5 is extended toward the side of the main portion thereof to which the flange of the hub is secured and has a feathered edge 13 whereby the same conforms with the surface of the rim plates 11, to present an even and unbroken surface. The bulged portion and the laterally extending peripheral edge portion of the connecting plate, together with the consequent positioning of the rim plates 11, cause a very even distribution of the weight.

By the herein described method of constructing fly wheels, an approximately fifty per cent. saving is effected and the resultant product is as efficient and presents as neat an appearance as fly wheels constructed by the former method of casting.

I claim:

1. A wheel of the character described comprising a connecting plate struck from a single sheet of material and having a central dished portion provided with a centrally arranged aperture, a hub secured to one side of the connecting plate at said aperture, said connecting plate having an annular peripheral groove, the outer edge portion of the plate forming the outer wall of said groove being extended laterally toward the side of the main portion of the plate to which said hub is secured, and an annular flat rim plate disposed in said peripheral groove and having one face engaging the face of the latter and secured thereto, said rim plate being thereby disposed on the same side of the connecting plate as that to which said hub is secured.

2. A wheel of the character described, comprising a centrally apertured connecting plate struck from a single sheet of material and formed with an annular peripheral groove, a hub secured to the connecting plate at said aperture, and an annular rim plate struck from a single sheet of material and secured in the annular groove of said connecting plate, the outer edges of said rim plate being rounded and the edges of the annular groove of said connecting plate being rounded to conform with the rounded edges of said rim plate whereby to provide a snug fit therefor, and the extreme peripheral edge of said connecting plate being feathered and curved inwardly to present an unbroken surface where it joins the rim plate there-adjacent, substantially as described.

In testimony that I claim the foregoing I have hereunto set my hand at Milwaukee, in the county of Milwaukee and State of Wisconsin.

WILLIAM S. HARLEY.